UNITED STATES PATENT OFFICE.

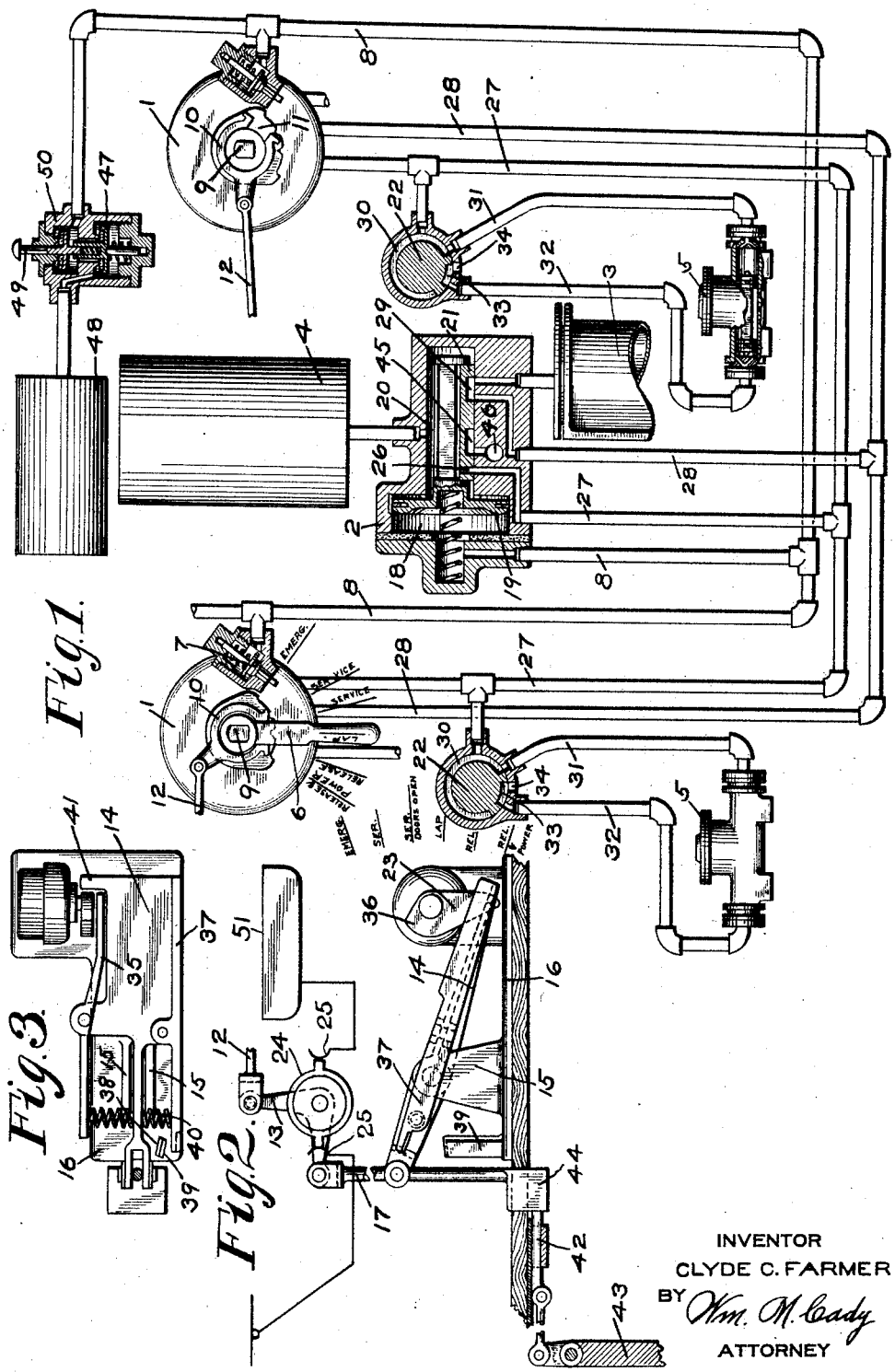

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

CAR DOOR AND BRAKE CONTROLLING DEVICE.

1,415,821. Specification of Letters Patent. Patented May 9, 1922.

Application filed April 2, 1920. Serial No. 370,636.

*To all whom it may concern:*

Be it known that I, CLYDE C. FARMER, a citizen of the United States, residing at Edgewood, in the county of Allegheny and State of Pennsylvania, have invented new and useful Improvements in Car Door and Brake Controlling Devices, of which the following is a specification.

This invention relates to car controlling apparatus and has for its principal object to provide an improved equipment in which the power for propelling the car, the brakes, and the car doors are controlled according to the position of a common operating treadle or arm.

Other objects and advantages will appear in the following more detailed description of the invention.

In the accompanying drawing: Fig. 1 is a diagrammatic view, partly in section of a car controlling equipment embodying my invention; Fig. 2 an elevational view of the treadle mechanism employed in connection with the equipment shown in Fig. 1; and Fig. 3 a plan view of said treadle mechanism.

The equipment shown in Fig. 1 of the drawing is of the double ended type having a straight air brake valve 1 at each end of the car, a straight air emergency valve device 2, a brake cylinder 3, a main reservoir 4, and a door engine 5 for controlling the car doors at each end of the car.

Each brake valve 1 may be of the usual straight air type having a removable operating handle 6, but in addition, according to my invention, there is provided a tappet valve 7 which is adapted to be operated by the handle 6 upon a certain movement for venting fluid from the emergency brake pipe 8 to effect an emergency application of the brakes.

Mounted on the brake valve body concentric with the valve stem 9 of the brake valve 1 is a collar 10 having an opening 11 through which the handle 6 may be applied to the valve stem and said collar is adapted upon rotation to shift the handle to its various operating positions.

The collar 10 is pivotally connected to a rod 12, the opposite end of which is pivoted to a bell crank lever 13.

For operating the lever 13 a treadle 14 is provided, which is pivotally mounted between the standards 15 of a base plate 16. The treadle 14 is pivotally connected to a rod 17 which in turn is pivotally connected to one arm of the bell crank lever 13.

The straight air emergency valve device 2 may comprise a casing having a piston chamber 18, connected to the emergency brake pipe 8 and containing a piston 19 and having a valve chamber 20 connected to the main reservoir 4 and containing a slide valve 21 adapted to be operated by piston 19 for controlling the application and release of the brakes.

For controlling the car doors, a valve device associated with the treadle mechanism is provided having a rotary valve 22 adapted to be operated by a cam lever 23.

The electric power for driving the car is controlled by the movement of the treadle mechanism through a contact disk 24 mounted to rotate with the bell crank lever 13 and adapted in one position to close a circuit through contact fingers 25, by which a power controller 51, such as an automatic controller of the well known H L type is caused to operate so as to supply current for operating the car motors in the usual manner.

The rod 17 is weighted, so that when the foot is removed from the treadle 14, the parts will be moved to emergency application position by the gravity action of the weighted rod 17.

In operation, as so far described, the valve chamber 20 of the emergency valve device 2 is charged with fluid under pressure from the main reservoir 4 and fluid flows from said valve chamber through a port 26 in slide valve 21 to the main reservoir pipe 27 and thence to each brake valve device 1.

With the treadle 14 held depressed by the foot, the brake valve handle at the operating end of the car will be moved to release and power position, as shown in Fig. 1, in which the usual ports in the brake valve connect the straight air pipe 28 with the atmosphere, so that the brake cylinder 3 is exhausted through cavity 29 in slide valve 21 and the straight air pipe 28 to the atmosphere.

The power controller circuit is closed in this position through the contact disk 24, so that current is supplied to the car motors for running the car in the usual manner.

In this position, the cam lever 23 holds the rotary valve 22 in the position shown in Fig. 1, so that a cavity 30 connects the main reservoir pipe 27 with a pipe 31, through which fluid under pressure is supplied to the door engine 5 for holding the car doors closed, the door opening pipe 32 being connected through a cavity 33 in the rotary valve 22 with an exhaust port 34.

At the non-operating end of the car, as shown at the right of Fig. 1, the rotary valve 22 will remain in the same position, so as to hold the doors closed at the rear end of the car.

At the non-operating end, the handle having been removed from the brake valve 1 in the lap position of the brake valve, the removal of the foot from the treadle at that end of the car will not operate the brake valve, for although the ring 10 will be moved to emergency position, the valve stem 9 will remain in lap position, as shown.

The car may be controlled either by manipulation of the treadle 14 or the brake valve handle 6.

If it is desired to effect a service application of the brakes by the operation of the treadle 14, the treadle is allowed to move upwardly by the action of the weighted rod 17 until the service position is reached. In this movement, the contact disk 24 is rotated so as to open the power circuit to the controller and thus cut off current to the car motors and the brake valve is turned through the movement of the handle 6 by the ring 10 to service application position, in which fluid under pressure is supplied from the main reservoir pipe 27 to the straight air pipe 28 and thence to the brake cylinder 3.

In service position, the car doors remain closed, but if it is desired to open the car doors at the operating end of the car, a lever 35, pivotally mounted on the treadle 14 is shifted sideways by the foot, so that said lever engages over the top of the projecting portion 36 of the cam lever 23.

It will now be seen that by pressing the treadle 14 downwardly to service door open position, the lever 35 will act on the projection 36 to turn the cam lever 23, so that the rotary valve 22 is actuated to cause the cavity 33 to connect the door closing pipe 31 with exhaust port 34, while the door opening pipe 32 is connected through cavity 30 with the main reservoir pipe 27. The door engine 5 at the operating end of the car is thus operated to open the car doors at that end of the car.

If it is desired to remove the foot from the treadle 14 as well as the hand from the brake valve handle 6, without causing an emergency application of the brakes, the parts may be locked in the service door open position by means of a lever 37 which is pivotally mounted on the treadle 14.

In order to lock the parts in this position, the foot operated end of the lever 37 is pushed outwardly by the foot during the upper movement of the treadle to service position, so that the opposite end of the lever will ride on the inside of a stop member 39 and then in service door open position will engage a notch 38 formed in said stop member.

A spring 40 holds the lever 37 in this locked position and it will be seen that when the foot is removed from the treadle, the treadle is prevented from movement to emergency position by the stop member 39.

If it is desired to close the car doors, the treadle 14 may be further depressed to lap position. During this movement, a projection 41 on the treadle 14 engages the cam lever 23 and moves said lever and the rotary valve 22 back to the door closed position.

In order to ensure that power will not be supplied to the car motors so long as the car doors are open, the car door is connected to a sliding latch member 42, which is adapted when the car door 43 is in open position to engage over the top of a projection 44, carried by the rod 17. The relation of the latch 42 to the projection 44 is such that the treadle 14 cannot be moved downwardly below the lap position, so long as the car door remains open.

When the car door has been closed by movement to lap position, the latch 42 is withdrawn, so that the rod 17 is free to move upwardly and the treadle may then be further depressed to the release and power position, in which the brakes are released, and the contact disk 25 is in position for closing the power circuit to the controller.

The brakes may also be controlled by manipulation of the brake valve handle 6, and with the foot removed from the treadle 14, the car doors are also controlled by the movement of the ring 10 when the handle 6 is shifted to its operating positions, the treadle 14 being shifted through the operating connections from the ring 10 to the treadle. As will be evident, the movement of the brake valve handle to apply the brakes also operates to open the circuit, since the contact disk 25 is rotated by the movement of the bell crank lever 13.

If the foot is removed from the treadle 14 and the hand is not holding the brake valve handle 6, the treadle 14 will be shifted to emergency application position by the action of the weighted rod 17, and the brake valve handle will also be moved to emergency application position, in which the handle is adapted to engage and open the tappet valve 7, so that fluid is vented from the emergency brake pipe 8. The emergency piston 19 then operates to shift the slide valve 21, so that fluid under pressure is supplied from the valve chamber 20 and the main reservoir 4 directly to the brake cylinder 3, to effect an emergency application of the brakes.

In order to permit the car doors at both ends of the car to be opened at will in case of an emergency, the movement of the emergency slide valve 21 is adapted to vent the main reservoir pipe 27 through cavity 45 to an exhaust port 46, so that fluid under pressure is vented from the door closing pipe 31 at both the front and the rear ends of the car. Since the door opening pipe is at atmospheric pressure, the venting of fluid from the door closing pipe operates to balance the fluid pressures on the door engine, so that the doors may be manually opened at will.

In order to release the brakes after an emergency application a manually operated valve device may be provided for controlling the admission of fluid under pressure from a normally charged reservoir to the emergency brake pipe.

The valve device may comprise a casing 50 containing a spring pressed valve 47 for controlling communication from the brake pipe 8 to a reservoir 48.

Said reservoir is charged from the brake pipe past the valve 47 and normally remains charged. When the brake pipe pressure is reduced in effecting an emergency application of the brakes, the valve 47 prevents back flow from the reservoir to the brake pipe.

If it is desired to release the brakes after an emergency application, a tappet 49 is pressed so as to open the valve 47 and admit fluid from the reservoir to the brake pipe 8. The brake pipe pressure is thus increased so as to effect the movement of the emergency piston 19 to release position.

Having now described my invention, what I claim as new and desire to secure by Letters Patent, is:—

1. In a safety car control equipment, the combination with a brake valve device for controlling the car brakes having an operating handle, of means for controlling the car doors and a treadle operatively connected to said handle for also operating said brake valve device and for controlling said means.

2. In a safety car control equipment, the combination with an emergency brake pipe, a valve for venting fluid from said brake pipe to effect an emergency application of the brakes, and a brake valve device having an operating handle adapted upon movement to emergency position for operating said valve, of a foot operated treadle operatively connected to said handle and adapted upon the removal of the foot therefrom to operate said emergency valve.

3. In a safety car control equipment, the combination with a brake valve device for controlling the application and release of the brakes, of means for controlling the opening and closing of the car doors, said means being inoperative to effect the opening of the car doors unless the brakes have been applied.

4. In a safety car control equipment, the combination with a brake valve device for controlling the application and release of the brakes, of a manually operated member operatively connected to said brake valve device and having a brake application position, and means operative only upon movement of said member to application position for opening the car doors.

5. In a safety car control equipment, the combination with a brake valve device for controlling the application and release of the brakes, of a manually operated member operatively connected to said brake valve device and having a brake application position, a fluid pressure operated door engine for controlling the opening and closing of the car doors, valve means for controlling the fluid pressure on said engine, and means operative only upon movement of said member to brake application position for actuating said valve means to vary the fluid pressure on said door engine for opening the car doors.

6. In a safety car control equipment, the combination with a foot treadle and means operated by said treadle for effecting a service application of the brakes in one position and an emergency application of the brakes in another position, said treadle being adapted to move to emergency position upon release of the treadle, of means operative upon movement to effect a service application of the brakes for locking said treadle against movement to emergency position.

7. In a safety car control equipment, the combination with means for controlling the brakes and a treadle for operating said means, of a fluid pressure operated door engine for controlling the operation of the car doors, and valve means operated by said treadle for controlling the fluid pressure in said door engine.

8. In a safety car control equipment, the combination with a treadle for controlling the current for running the car motors and for controlling the operation of the car doors, of means operated by the opening of the car doors for preventing movement of the treadle to the position for supplying current to the car motors.

9. In a safety car control equipment, the combination with a treadle for controlling the current for running the car motors and for controlling the operation of the car doors, of means operated by the opening of the car doors for preventing movement of the treadle to the position for supplying current to the car motors and adapted to release said treadle upon closing of the car doors.

10. The combination with an emergency valve device for controlling the car brakes, of a door engine operated by fluid under pressure for controlling the car doors at each end of the car, a pipe for normally supplying fluid under pressure to the door engines for holding the car doors closed and means for venting fluid from said pipe upon movement of said valve device to emergency position for balancing the fluid pressures on said door engines to thereby permit the car doors to be opened by hand.

11. In a safety car control equipment, the combination with means for controlling the application and release of the brakes, power for the car motors, and the car doors, of a foot treadle for operating said means and adapted upon removal of the foot from the treadle to cut off power and effect an emergency application of the brakes.

12. In a safety car control equipment, the combination with means for controlling the application and release of the brakes, power for the car motors, and the car doors, of a foot treadle for operating said means and having one position for opening the power circuit and applying the brakes and another position for opening the car doors.

13. In a safety car control equipment, the combination with means for controlling the application and release of the brakes, power for the car motors, and the car doors, of a foot treadle for operating said means and having one position for opening the power circuit and applying the brakes, another position for opening the car doors, and another position in which the brakes are released and the power circuit is closed.

14. The combination with a brake pipe and an emergency valve device operated upon a reduction in brake pipe pressure for effecting an emergency application of the brakes, of a reservoir adapted to be normally charged with fluid under pressure and a manually operated valve for supplying fluid from said reservoir to the brake pipe to effect the release of the brakes after an emergency application.

In testimony whereof I have hereunto set my hand.

CLYDE C. FARMER.